United States Patent
Bajpay et al.

(10) Patent No.: US 7,584,083 B1
(45) Date of Patent: Sep. 1, 2009

(54) MODELING AND SIMULATION OF WORKCENTER PROCESSES

(75) Inventors: Paritosh Bajpay, Edison, NJ (US); Hossein Eslambolchi, Los Altos Hills, CA (US); John McCanuel, Bailey, CO (US); Sridar Seetharaman, Edison, NJ (US)

(73) Assignee: AT&T Corp., New York, NY (US)

( * ) Notice: Subject to any disclaimer, the term of this patent is extended or adjusted under 35 U.S.C. 154(b) by 530 days.

(21) Appl. No.: 11/321,639

(22) Filed: Dec. 30, 2005

(51) Int. Cl.
*G06F 9/455* (2006.01)

(52) U.S. Cl. .................. 703/6; 703/22; 705/9; 705/11; 700/100

(58) Field of Classification Search ............. 703/6, 703/1, 22; 705/7, 8, 9, 11; 725/109; 700/97, 700/108, 99, 100; 436/55; 707/4, 101; 345/440; 709/223, 224, 226
See application file for complete search history.

(56) References Cited

U.S. PATENT DOCUMENTS

| | | | |
|---|---|---|---|
| 5,490,097 A | 2/1996 | Swenson et al. | |
| 6,404,445 B1 | 6/2002 | Galea et al. | |
| 6,411,922 B1 | 6/2002 | Clark et al. | |
| 6,516,306 B1 | 2/2003 | Alur et al. | |
| 6,668,056 B2 | 12/2003 | Rupe et al. | |
| 6,738,736 B1 | 5/2004 | Bond | |
| 6,874,022 B1 | 3/2005 | Carew et al. | |
| 6,972,761 B1* | 12/2005 | Cox et al. ................. | 345/440 |
| 2002/0193972 A1* | 12/2002 | Kudo et al. ................ | 703/1 |
| 2002/0199203 A1* | 12/2002 | Duffy et al. .............. | 725/109 |
| 2005/0165930 A1* | 7/2005 | Whitman ................. | 709/226 |
| 2005/0278670 A1* | 12/2005 | Brooks et al. ............. | 716/5 |
| 2005/0288808 A1* | 12/2005 | Lopez et al. .............. | 700/97 |
| 2006/0010017 A1* | 1/2006 | Hase et al. ................ | 705/7 |
| 2006/0015387 A1* | 1/2006 | Moore et al. .............. | 705/8 |
| 2006/0053106 A1* | 3/2006 | Bhaghavan et al. ......... | 707/4 |
| 2006/0059253 A1* | 3/2006 | Goodman et al. .......... | 709/223 |
| 2006/0069541 A1* | 3/2006 | Walacavage et al. ........ | 703/22 |
| 2006/0100728 A1* | 5/2006 | Brown .................... | 700/97 |
| 2006/0179028 A1* | 8/2006 | Bram et al. ............... | 706/47 |
| 2006/0184264 A1* | 8/2006 | Willis et al. .............. | 700/108 |
| 2006/0277089 A1* | 12/2006 | Hubbard et al. ........... | 705/9 |
| 2007/0038657 A1* | 2/2007 | Denton et al. ............. | 707/101 |
| 2007/0059838 A1* | 3/2007 | Morrison et al. .......... | 436/55 |

* cited by examiner

*Primary Examiner*—Paul L Rodriguez
*Assistant Examiner*—Kandasamy Thangavelu

(57) ABSTRACT

A method includes generating a model of an existing workcenter process and a modified version of the existing workcenter process based on one or more decision-making parameters. The workcenter process is a workcenter process for a telecommunications network. The model for the existing workcenter process and the model for the modified version of the existing workcenter process are simulated to determine whether to modify any of the process steps in the existing workcenter process. The decision is based on the effect on the decision-making parameter(s) of modifying the workcenter process from the existing workcenter process.

20 Claims, 3 Drawing Sheets

*FIG. 2*

| DECISION-MAKING PARAMETERS | MANUAL PROCESS STEP 1 | MANUAL PROCESS STEP 2 | MANUAL PROCESS STEP 3 | TOTAL |
|---|---|---|---|---|
| TIME (MIN) | 45 | 60 | 30 | 135 |
| COST ($) | 140 | 340 | 400 | 880 |

*FIG. 3*

| DECISION-MAKING PARAMETERS | MANUAL PROCESS STEP 1 | MODIFIED PROCESS STEP 2 | MANUAL PROCESS STEP 3 | TOTAL |
|---|---|---|---|---|
| TIME (MIN) | 45 | 20 | 30 | 95 |
| COST ($) | 140 | 100 | 400 | 640 |

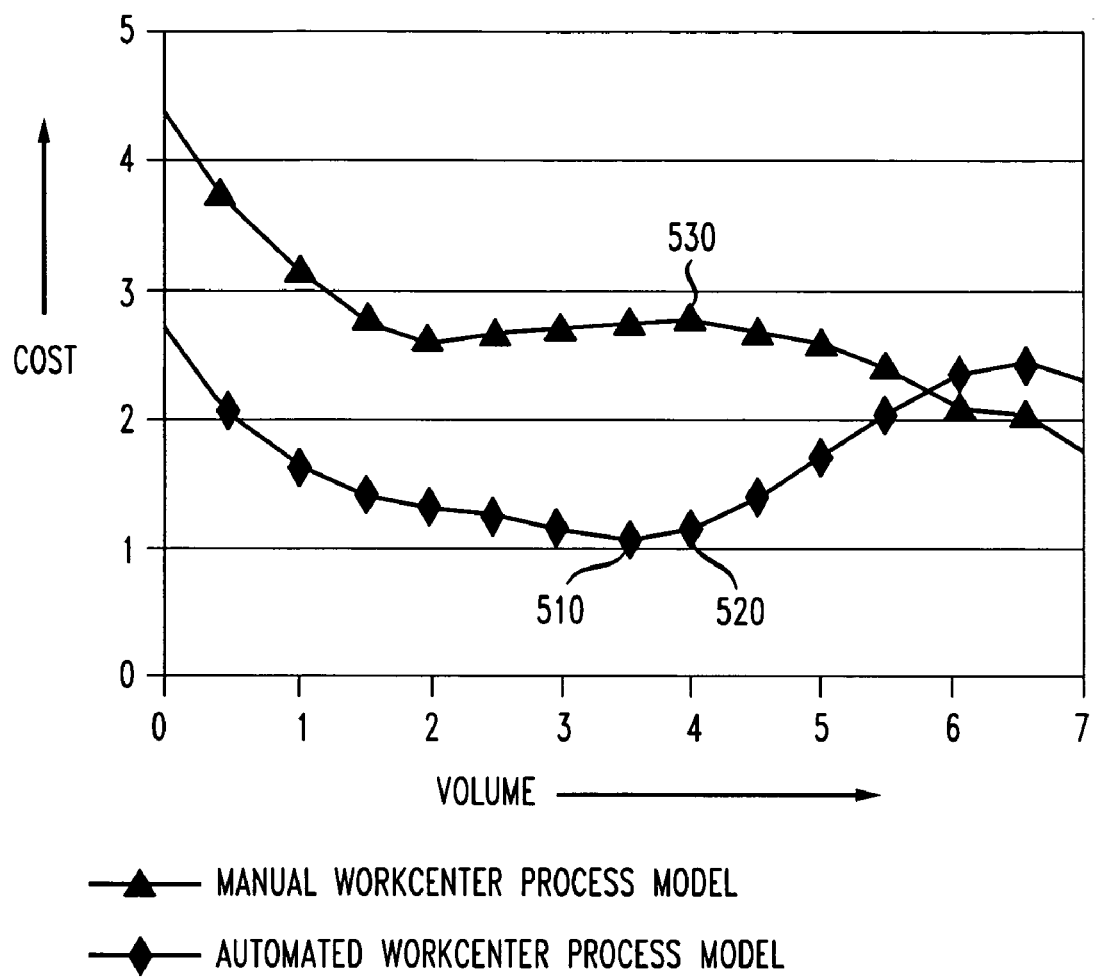

MODELING AND SIMULATION OF WORKCENTER PROCESSES

FIELD OF INVENTION

The invention relates generally to telecommunications network workcenters and, more particularly, to a method for modeling and simulating a workcenter process to determine whether to modify one or more process steps in the workcenter process.

BACKGROUND

Servicing a variety of customers distributed throughout a large telecommunications network requires a significant number of personnel and equipment employing a variety of workcenter processes. Many of these workcenter processes involve the execution of tasks such as tracking problem tickets, verifying problems, performing maintenance, and resolving telecommunications network issues by detecting problems, analyzing test results, and making network changes. The workcenter processes are often not optimized and are outdated, producing undesirable results such as prolonged problem resolution time periods, decreased telecommunications network performance, and added costs. By improving and automating workcenter processes, these undesirable results can be minimized. However, often it is difficult to determine which process steps in a workcenter process should be modified, improved, and/or automated. Thus, there is a need for a method of modeling and simulating workcenter processes to determine which steps in a workcenter process, if any, can or should be modified.

SUMMARY OF THE INVENTION

A method includes generating a model of an existing workcenter process and a modified version of the existing workcenter process based on one or more decision-making parameters. The workcenter process is a workcenter process for a telecommunications network. The model for the existing workcenter process and the model for the modified version of the existing workcenter process are simulated to determine whether to modify any of the process steps in the existing workcenter process. The decision is based on the effect on the decision-making parameter(s) of modifying the workcenter process from the existing workcenter process.

BRIEF DESCRIPTION OF THE DRAWINGS

FIG. 2 is a table illustrating an empirical workcenter model.

FIG. 3 is a table illustrating the empirical workcenter model described in FIG. 2 with a modified process step.

FIG. 4 is a graph illustrating an embodiment of the invention.

DETAILED DESCRIPTION

Figure 1:
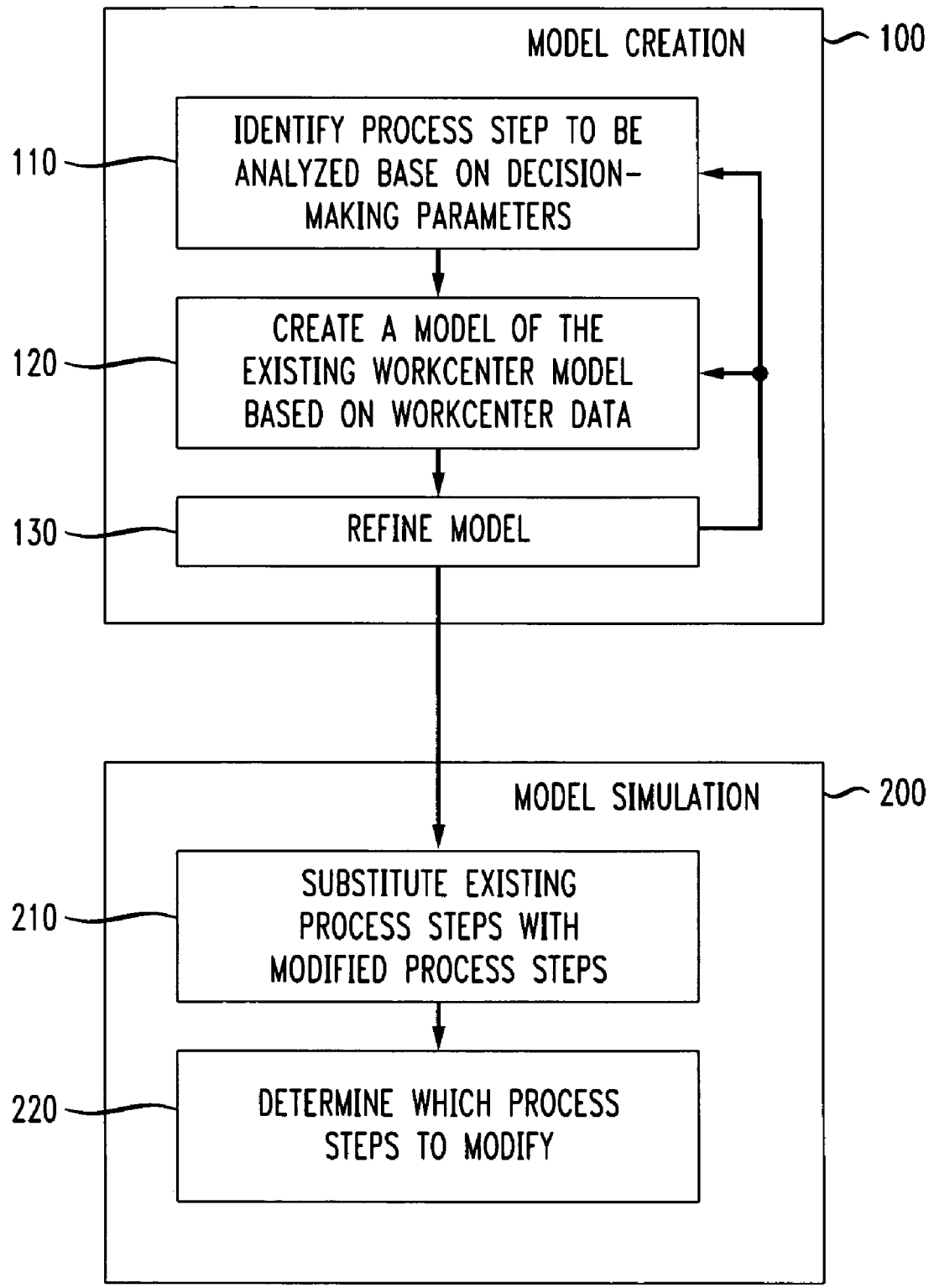
FIG. 1 is a flowchart illustrating an embodiment of the invention.

FIG. 1 is a flowchart illustrating the method of modeling and simulating an existing workcenter process for a telecommunications network to determine whether at least one part of the existing workcenter process can or should be modified. The telecommunications network can be any kind of telecommunications network including a local or wide area network. The workcenter can be any workcenter related to the telecommunications network such as a workcenter for resolving problem tickets or a workcenter for monitoring network transactions.

Modification of a process step includes a modification such as automation or any type of improvement, adjustment, or change of a process step within a workcenter process. For example, a workcenter process can include multiple process steps, one of which is the creation of a problem ticket. Modifying the problem ticket creation process can include changing the problem ticket creation step from a manual step executed by an ticketing agent to an automated step that utilizes an interactive voice response system.

The flowchart can be separated into two portions, model creation 100 and model simulation 200. In the model creation 100 portion of the flowchart, the existing workcenter process is modeled based on any combination of empirical or estimated workcenter data and equations. In the model simulation 200 portion of the flowchart, models of the existing workcenter process steps are replaced with models of modified workcenter process steps and a comparison of the models is used to determine whether the existing process steps can be effectively modified.

In the model creation 100 portion of the flowchart, the process steps from the existing workcenter process that are to be analyzed are first identified based on decision-making parameter(s) 110. This part of the model creation process 100 involves the selection and analysis of the existing process steps as well as the decision-making parameters. The decision-making parameters are the parameters being considered in the course of deciding whether or not to modify a particular portion of an existing workcenter process. Decision-making parameters can include any variable in the workcenter process such as cost, time, volume of work, personnel, equipment, customer satisfaction, rates, timing, etc. For example, a workcenter that implements a problem ticket resolution process may involve a complex combination of a multiplicity of process steps, but the only decision-making parameter important in a decision to automate the problem ticket resolution process may be the mean time to repair. In this situation, only the process steps that have a relatively significant impact on the mean time to repair will be considered in the model. Process steps, for example, that have a negligible impact on the mean time to repair, but a large impact on cost or personnel can be ignored.

In addition to the constraints imposed by the decision-making parameters, any portion, rather than all of the process steps, of an existing workcenter process can be considered for modeling and simulation. For example, only the last two steps of a twenty step process may be considered for modification even though the first eighteen steps of the process could have been considered for modification and will have an important impact on the decision-making parameters being considered.

The workcenter model of the existing workcenter process can include both steps of a workcenter process that can be readily modified and steps of a workcenter process that are difficult to modify. Although certain steps in an existing workcenter process may be difficult to modify, these steps can be included in the model for completeness and to clarify the relative impact of the steps that can or will be modified. For example, in a workcenter process for problem ticket resolution, the sending and receiving of problem tickets can be automated, but the actual maintenance on a physical connection may not be readily automated. If time is the decision-making parameter being used for the automation decision, the actual maintenance on a physical connection may be included in the model because it makes up a significant portion of the time necessary to execute the workcenter process. If the time of the maintenance on the physical connection were excluded from the model the benefits of automating other portions of the workcenter process may be skewed.

After the decision-making parameters and process steps have been defined, a workcenter model of the existing workcenter process is created using workcenter data 120. Any number of modeling techniques can be used to create a workcenter model using any combination of empirical or estimated data with any combination or number of linear or non-linear equations. The combination of data and/or equations are used to describe the process step and its affect on the decision-making parameter(s) important in deciding whether to modify a workcenter process.

In some embodiments, entirely empirical models without equations can be used to describe the existing workcenter process. For example, if time is the primary decision-making parameter, a process step of picking-up a problem ticket after it is created can be modeled using entirely empirical data. Data for the time that it takes to pick-up a problem ticket after it is created can be collected for a day or even months. The distribution(s) of the data or any statistical combination of the data such as an average pick-up time can be used to describe the problem ticket pick-up process step. The amount and type of data can be adjusted based on the desired accuracy and significance of the process step on the decision-making parameters. In an empirical model, the volume of data can have an impact on the accuracy of the model.

In some embodiments, estimated data, rather than empirical data, can suffice for the workcenter model of the existing workcenter process. For example, incoming problem ticket volume, if a necessary variable in a particular workcenter model, can be estimated based on problem ticket resolution data or problem ticket closure data without actually measuring the incoming problem ticket volume. The accuracy of the model can be compromised when estimated data is used, but in some models, estimated data can be tolerated and may not materially affect the accuracy of the model.

In some embodiments, the model of a process step can be a complex model that involves combinations of single or multiple simultaneous linear and/or non-linear equations with multiple dependent or independent variables with any combination of estimated or empirical data. For example, a repair process step may depend on variables such as equipment available, personnel available, and type of problem. Accurately modeling this type of process step can involve empirical data and multiple simultaneous equations to describe the several possible and interdependent situations. In complex models, often assumptions can be made to simplify the model without materially affecting the accuracy of the model or materially altering its actual affect on the decision-making parameters.

Models for each of the process steps can be further complicated by loops in the existing workcenter process. In a problem ticket resolution process, for example, some problem tickets may require significant attention and will loop through a workcenter process multiple times, while some problem tickets will be resolved with little intervention and no looping. When a loop occurs in a workcenter process, linear or non-linear coefficients that act as multiplying factors can be applied to the portions of the looping workcenter process to account for the loops. For example, if a portion of a workcenter process is typically executed twice, a simple coefficient of two can be multiplied by the models for each of the process steps to account for the loop. However, if a portion of a workcenter process is executed on a different schedule, non-linear constants taking into account additional variables can be included.

In some embodiments, a combination of different workcenter processes may be combined in a single workcenter process. In this situation, models for the different workcenter processes combined into the single workcenter process can be modeled and accounted for through the use of coefficients. For example, a problem ticket that is resolved with little intervention may skip certain process steps while resolving the problems described in other problem tickets will require additional process steps. This combination is, in essence, a combination of multiple workcenter processes into a single workcenter process. Coefficients can be multiplied by the additional workcenter process steps to account for the frequency of use of the additional workcenter process steps.

Each of the separate process steps within an existing workcenter process can be modeled using different techniques. For example, one process step can be modeled using an empirical model while another process step can be modeled using estimated data. Yet another process step in the same workcenter process can be modeled using a combination of estimated data, empirical data, and equations. Also, each of the process steps within the workcenter model can have a common set of assumption and/or an individual set of assumptions. Although several modeling techniques were described above, any modeling technique can be applied in the modeling of a workcenter process.

After the model of the existing workcenter process has been created, the model can be refined 130. Refining the model can include testing and/or comparing the model with empirical data to determine whether additional variables, equations, data, or coefficients are necessary. For example, the results for the process steps can be added together and compared with empirical data for the total of the process steps for the workcenter process at a particular set of conditions. This type of comparison can be performed at multiple sets of conditions to determine if the model accurately reflects the actual workcenter process in a variety of scenarios. If the totals using the model and the empirical data are comparable, then the model may not need to be adjusted. Each of the models for individual process steps can also be compared with empirical data for the individual process steps.

If the model is entirely empirical, the result from the sum of the process steps of the empirical model and the total of the empirical data will be identical or nearly identical. However, the model may show that more accurate representations of the process steps in the workcenter process are necessary to accurately understand the relative impact of each of the process steps on the decision-making parameters. In this situation, refining the model can include collecting additional data to obtain more accurate measurements for one or more of the process steps. Correction factors may also be required to correct for deviations.

For models based on estimated values or representative equations, the comparison of the workcenter model and empirical data can potentially reveal significant deviation. For some deviations, only the variables and/or coefficients in the workcenter model may need to be adjusted. In some cases more data may need to be collected or equations may only need to be refined. For other deviations, including significant deviations, additional process steps can be identified based on the decision-making parameters 110 and/or new models can be created based on workcenter data 120.

In the model simulation 200 portion of the flowchart, the model of the existing process model is simulated and evaluated. In this embodiment the simulation includes replacing process steps of the existing workcenter process model with modified process steps 210 and evaluating the effect on the decision-making parameters by the replacement to determine which, if any, of process steps should be modified 220. Both automated and non-automated process steps in the existing workcenter model can be replaced with even slight modifications or adjustments of the existing process steps. Individual process steps can be replaced with modified process steps or any combination of process steps can be replaced with any combination of modified process steps. Each of the modified process steps, which can be automated, adjusted, or improved process steps, can be modeled using a model creation process similar to the model creation process used to create the model of the existing workcenter process.

A determination of which, if any, of the process steps to modify can be made by comparing the values of the decision-making parameters before and after adding the modified process steps to the existing workcenter process model. For example, if a replacement of a manual process step in the model for the existing workcenter process with an automated process step results in a significant improvement in a decision-making parameter, the replacement of the manual process step may be desirable. However, multiple decision-making parameters can be affected by a single or combination of changes. In some workcenter process models, some decision-making parameters may be adversely affected while other decision-making parameters may be favorably affected. Any combination of the decision-making parameters can be evaluated and/or weighted in making a determination about whether to replace a particular existing process step with a modified process step.

In some embodiments, the process steps may not be replaced by a different or modified process step. The process steps in the existing workcenter model may simply be rearranged. For example, the process steps of an existing workcenter model can be rearranged if the workcenter process will permit the rearrangement of the process steps. If the workcenter process steps are rearranged, the existing workcenter process steps can be remodeled based on the rearrangement of the process steps. Also, process steps can be removed from the existing workcenter process and the result can be modeled and compared with the model of the existing workcenter process. The analysis and methods applied when workcenter process steps are replaced by modified workcenter process steps can be used in the analysis of a rearrangement of or substraction of process steps in an existing workcenter process.

FIGS. 2-3 are tables that contain empirical data for existing and modified process steps and illustrate the model creation and model application processes described above. FIG. 2 is an empirical data model of a workcenter process with three manual process steps 1, 2, and 3. The decision-making parameters 300 in the model are time in minutes and cost in dollars. The table includes values for each of the manual process steps 1-3 and the decision-making parameters 300, as well as values for the total 340 for each decision-making parameter 300. The total 340 for the time decision-making parameter for the workcenter process is 135 minutes, while the total 340 for the cost decision-making parameter is $880.

FIG. 3 is a table that includes the data from the empirical data model of the workcenter process described in FIG. 2, however, manual process step 2 has been replaced with modified process step 2. Modified process step 2 in FIG. 3 is an empirical data model of a modified version of the manual process step 2 in FIG. 2. The modified process step 2 in FIG. 3 uses the same conditions and assumptions used in the model in FIG. 2. With the modified process step 2, the total 440 for the time decision-making parameter is ninety-five minutes and the total 440 for the cost decision-making parameter is $640.

The difference between the empirical data model in FIG. 2 and the empirical data model in FIG. 3, if analyzing the decision-making parameter totals, is a decrease in time of forty minutes and a decrease in cost of $240. If minimizing the cost and time is desirable for the workcenter process and if using the data described in FIGS. 2-3, replacing manual process step 2 with modified process step 2 may be advantageous.

In some embodiments the assumptions between the existing workcenter process model and the modified workcenter process model can be slightly different. It may be difficult or impractical to use identical assumptions between the models if, for example, the existing workcenter process and modified workcenter process employ different equipment with intrinsically different qualities. Also, in some embodiments, additional decision-making parameters important in making a decision on whether or not to modify a process can be introduced by the modified process steps.

FIG. 4 is a representative graph that illustrates the cost versus volume for a model of an entirely manual workcenter process and a model of an entirely automated version of the manual workcenter process. The vertical axis is cost in arbitrary units and the horizontal axis is volume in arbitrary units. The cost and volume are the decision-making parameters for this particular workcenter process. In this embodiment, it is desirable to minimize the ratio of the cost to volume.

In the automated version of the workcenter process, each of the manual process steps in the workcenter process have been replaced with automated process steps. The conditions and basic assumptions used to create the manual and automated models are the same. The graphs in this embodiment are a result of manual and automated models that include both empirical data and multiple equations solved simultaneously.

Using the data in the figure, a cost to volume ratio comparison for the manual model and automated model for a workcenter process can be accomplished. The figure shows that the minimum ratio of cost to volume is at point 520 on the automated model line. The value of the ratio is approximately 0.28. At the same volume measurement as point 520 on the automated model line, the manual model ratio of cost to volume is nearly three times higher as shown on the graph at point 530. Note that the minimum ratio point 520 is at a higher volume measurement than the overall cost minimum point shown on the graph at point 510 on the automated model line. Although in this embodiment, the ratio of the cost to volume was analyzed based on all of the process steps in the workcenter process, in some embodiments, each of the process steps can be analyzed separately.

In some embodiments, not all of the process steps from the manual workcenter process have to be replaced by automated process steps. Each of the process steps can be replaced individually or in different combinations and each of the resulting models can be graphed and analyzed. It is possible, for example, that replacement of only some of the process steps in the manual workcenter process with automated process steps can result in similar and acceptable minimum cost to volume ratios. The creation of the models and the analysis of the results of the models for existing and modified workcenter processes can be accomplished using a device such as a computer to accurately calculate optimal points and scenarios for workcenter processes.

While various embodiments of the invention have been described above, it should be understood that they have been presented by way of example only, and not limitation. For example although the method for managing network event messages is shown and described as including a determination of the whether the indication is associated with an advisory message or alarm message before determining whether the indication is associated with a predefined circuit, in some embodiments, the determination of whether the indication is associated with a predefined circuit is done first.

Similarly, although the specific response procedure is shown and described with a specific order of the monitoring operations, those operations can be rearranged in any order. Furthermore, the monitoring operations need not occur in a serial fashion, but can occur in parallel.

What is claimed is:

1. A method for modifying an existing workcenter process for a telecommunications network, the method to be executed on a computer, comprising:

generating, using the computer, a first model of an existing workcenter process based on at least one decision-making parameter, wherein the workcenter process is a process for resolving problem tickets;

generating, using the computer, a second model of a modified version of the existing workcenter process based on the at least one decision-making parameter;

simulating, using the computer, the first model and the second model to determine whether to modify the existing workcenter process; and if it is determined to modify the existing workcenter process based on the simulating step, then modifying the existing workcenter process for the telecommunication network.

2. The method of claim 1, wherein the workcenter process includes at least one process step.

3. The method of claim 1, wherein the workcenter process includes at least one automated process step.

4. The method of claim 1, wherein simulating the first model and the second model includes replacing at least one process step in the workcenter process with at least one process step from the modified version of the workcenter process.

5. The method of claim 1, wherein the modified version of the workcenter process is the workcenter process with at least one process step removed.

6. The method of claim 1, wherein simulating the first model and the second model includes replacing the workcenter process with the modified version of the workcenter process.

7. The method of claim 1, wherein the modified version of the workcenter process includes a rearranged version of the workcenter process.

8. The method of claim 1, wherein simulating the first model and the second model includes comparing the effect of the first model on the at least one decision-making parameter with the effect of the second model on the at least one decision-making parameter.

9. The method of claim 1, further comprising generating, using the computer, the second model of the modified version of the workcenter process based on an additional decision-making parameter.

10. The method of claim 1, wherein generating the first model includes generating the first model based on workcenter process data, the workcenter process data being at least any one of empirical workcenter process data and estimated workcenter process data.

11. The method of claim 1, wherein the first model includes a coefficient for a workcenter process loop; the coefficient acting as a multiplying factor applied to process steps in the workcenter process loop.

12. The method of claim 1, wherein the first model is an empirical data model.

13. The method of claim 1, further comprising verifying, using the computer, the first model using workcenter process data, the workcenter process data being at least any one of empirical workcenter process data and estimated workcenter process data.

14. The method of claim 1, further comprising refining, using the computer, the first model using workcenter process data, the workcenter process data being at least any one of empirical workcenter process data and estimated workcenter process data.

15. The method of claim 1, wherein generating the second model includes generating the second model based on estimated data.

16. The method of claim 1, wherein the second model is an empirical data model.

17. The method of claim 1, wherein the second model includes a coefficient for a workcenter process loop; the coefficient acting as a multiplying factor applied to process steps in the workcenter process loop.

18. The method of claim 1, further comprising verifying, using the computer, the second model using workcenter process data, the workcenter process data being at least any one of empirical workcenter process data and estimated workcenter process data.

19. The method of claim 1, wherein the assumptions for the first model and the assumptions for the second model are the same.

20. The method of claim 4, wherein the at least one process step in the workcenter process is a manual problem ticket creation process, and the at least one process step from the modified version of the workcenter process is an automated problem ticket creation process.

* * * * *